United States Patent
Freed et al.

(10) Patent No.: US 11,544,557 B2
(45) Date of Patent: Jan. 3, 2023

(54) IOT-BASED NETWORK ARCHITECTURE FOR DETECTING FAULTS USING VIBRATION MEASUREMENT DATA

(71) Applicant: Cisco Technology, Inc., San Jose, CA (US)

(72) Inventors: Michael Freed, Pleasanton, CA (US); Akshay Khushu, San Jose, CA (US); Christin Lin, Bellevue, WA (US); Andrew Ren Luo, Pleasanton, CA (US); Nina Maller, Granite Bay, CA (US); Janet Dukes Schlossberg, Palo Alto, CA (US); Shawn Brian Zhang, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 551 days.

(21) Appl. No.: 16/672,696

(22) Filed: Nov. 4, 2019

(65) Prior Publication Data
US 2021/0133559 A1    May 6, 2021

(51) Int. Cl.
*G01M 7/02*    (2006.01)
*G06N 3/08*    (2006.01)
(Continued)

(52) U.S. Cl.
CPC .............. *G06N 3/08* (2013.01); *G01M 7/022* (2013.01); *G05B 23/0235* (2013.01); *G06K 9/6267* (2013.01)

(58) Field of Classification Search
CPC ........ G06N 3/08; G06N 3/0445; G06N 20/00; G06N 3/0454; G06N 3/082; G01M 7/022;
(Continued)

(56) References Cited

U.S. PATENT DOCUMENTS

2017/0277995 A1    9/2017  Giering et al.
2019/0227528 A1*   7/2019  Abbott .................. G06N 20/00
(Continued)

FOREIGN PATENT DOCUMENTS

CN    105628383 B    2/2017
CN    108304927 A    7/2018

OTHER PUBLICATIONS

Ran Zhang et al., "Transfer Learning With Neural Networks for Bearing Fault Diagnosis in Changing Working Conditions", IEEE, Jun. 28, 2017, pp. 14347-14357.
(Continued)

*Primary Examiner* — Marcos L Torres
(74) *Attorney, Agent, or Firm* — Behmke Innovation Group LLC; Kenneth J. Heywood; Jonathon P. Western

(57) ABSTRACT

In one embodiment, a device in a network receives a machine learning encoder and decoder trained by a supervisory service. The service trains the encoder and decoder using vibration measurement data sent to the service by a plurality of devices. The device trains, based on the received encoder, a classifier to determine whether vibration measurement data is indicative of a behavioral anomaly. The device receives vibration measurement data captured by a particular set of one or more vibration sensors of a monitored system. The device evaluates, using the trained decoder, the received vibration measurement data to determine whether the data is indicative of a structural anomaly in the monitored system. The device evaluates, using the trained classifier, the received vibration measurement data to determine whether the data is indicative of a behavioral anomaly in the monitored system.

20 Claims, 7 Drawing Sheets

(51) Int. Cl.
G05B 23/02 (2006.01)
G06K 9/62 (2022.01)

(58) Field of Classification Search
CPC ...... G05B 23/0235; G05B 2219/37434; G05B 2219/37435; G05B 23/024; G06K 9/6267; G06K 9/6256; G06K 9/6262; G06K 9/6271; G01H 1/003; G01H 17/00; G06V 10/82
See application file for complete search history.

(56) References Cited

U.S. PATENT DOCUMENTS

2021/0148246 A1* 5/2021 Thirumalasetty ......... F01D 5/16
2022/0011763 A1* 1/2022 Negri ................. G05B 23/0283

OTHER PUBLICATIONS

Pei Cao et al., "Preprocessing-Free Gear Fault Diagnosis Using Small Datasets With Deep Convolutional Neural Network-Based Transfer Learning", IEEE, May 16, 2018, pp. 26241-26253.

Chuxu Zhang et al., "A Deep Neural Network for Unsupervised Anomaly Detection and Diagnosis in Multivariate Time Series Data", https://arxiv.org/pdf/1811.08055.pdf, Nov. 20, 2018, 9 pages.

Salima Omar et al., "Machine Learning Techniques for Anomaly Detection: An Overview", International Journal of Computer Applications (0975-8887), vol. 79—No. 2, Oct. 2013, pp. 33-41.

Jerone T. A. Andrews et al., "Transfer Representation-Learning for Anomaly Detection", Proceedings of the 33rd International Conference on Machine Learning, 2016, 5 pages.

Tailai Wen at al., "Time Series Anomaly Detection Using Convolutional Neural Networks and Transfer Learning" https://arxiv.org/pdf/1905.13628.pdf, May 31, 2019, 8 pages.

Vinay Kolar et al., "Techniques for a Machine-Learning-Based Approach for Code-Context Enrichment for Industrial Internet of Things Systems", IP.com No. IPCOM000249408D, Feb. 23, 2017, 14 pages.

Asoke K. Nandi et al., "Intelligent Vibration Signal Processing for Condition Monitoring", https://pdfs.semanticscholar.org/33fc/2a3634178d5ca4023b40f84c627ec2ad3ed5.pdf, 2013, 15 pages.

Huan Huang et al., "Bearing vibration data collected under time-varyingrotational speed conditions", https://www.sciencedirect.com/science/article/pii/S2352340918314124, Oct. 15, 2018, 5 pages.

* cited by examiner

IOT-BASED NETWORK ARCHITECTURE FOR DETECTING FAULTS USING VIBRATION MEASUREMENT DATA

TECHNICAL FIELD

The present disclosure relates generally to computer networks, and, more particularly, to an Internet of Things (IoT) network architecture for detecting faults using vibration measurement data.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

A key observation is that vibrations are often an early indication of faults in machines, motors, heating, ventilation and air conditioning (HVAC) systems, and many other devices and systems. However, actually detecting a fault using vibration measurement data remains challenging for a number of reasons. First, most devices and systems that exhibit vibrations prior to failure also exhibit some degree of vibration during their normal use, making it very difficult to create a model able to discern between normal and problematic behaviors, such as structural or behavioral anomalies. In addition, vibration sensors often produce inconsistent results across multiple devices of the same type. Thus, even were a model trained to assess a system based on vibration measurements from the system, the model is unlikely to be applicable to other systems.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
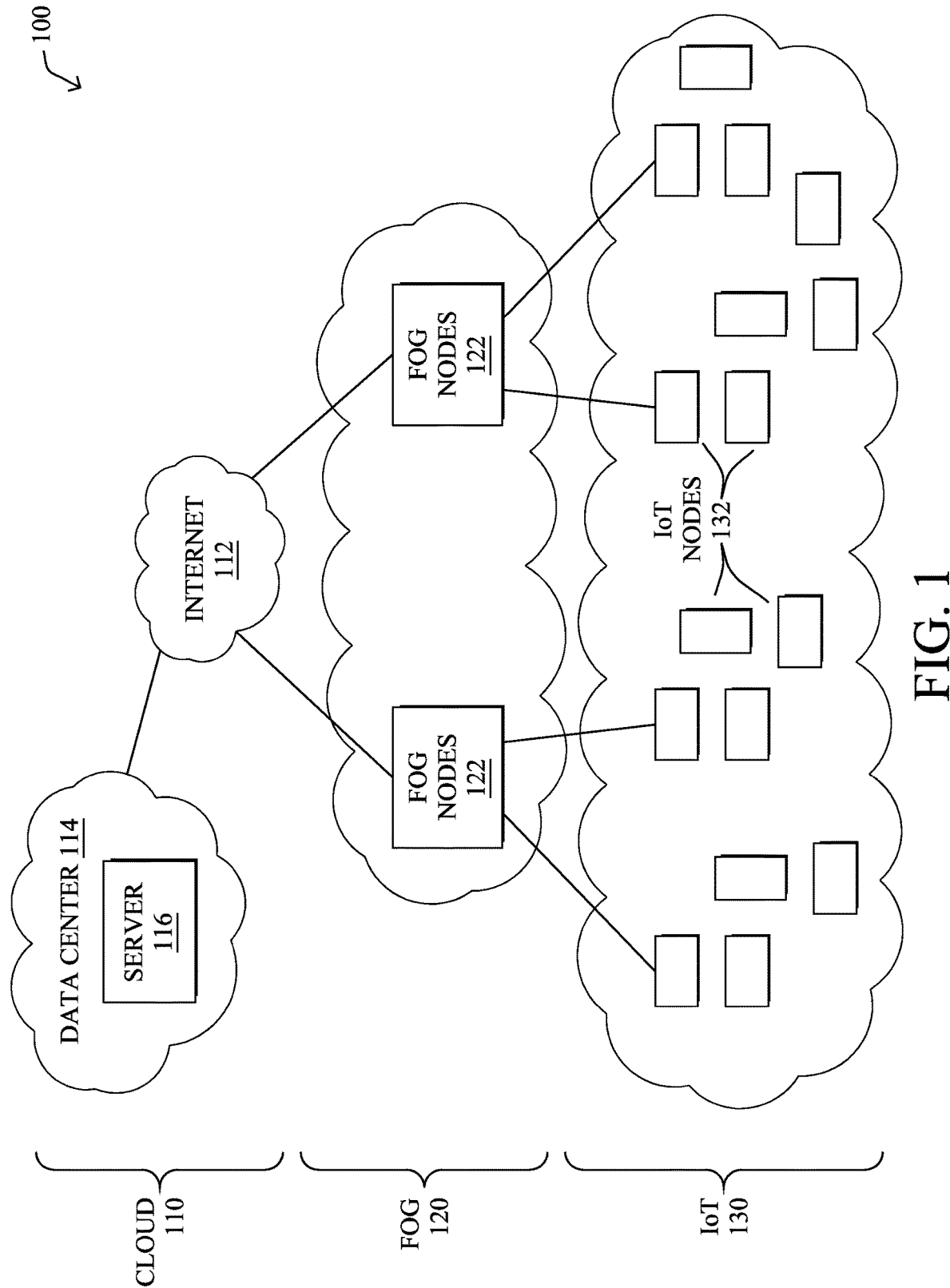
FIG. 1 illustrates an example network.

According to one or more embodiments of the disclosure, a device in a network receives a machine learning encoder and decoder trained by a supervisory service. The service trains the encoder and decoder using vibration measurement data sent to the service by a plurality of devices. The device trains, based on the received encoder, a classifier to determine whether vibration measurement data is indicative of a behavioral anomaly. The device receives vibration measurement data captured by a particular set of one or more vibration sensors of a monitored system. The device evaluates, using the trained decoder, the received vibration measurement data to determine whether the data is indicative of a structural anomaly in the monitored system. The device evaluates, using the trained classifier, the received vibration measurement data to determine whether the data is indicative of a behavioral anomaly in the monitored system.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, fog layer 120, and IoT device layer 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
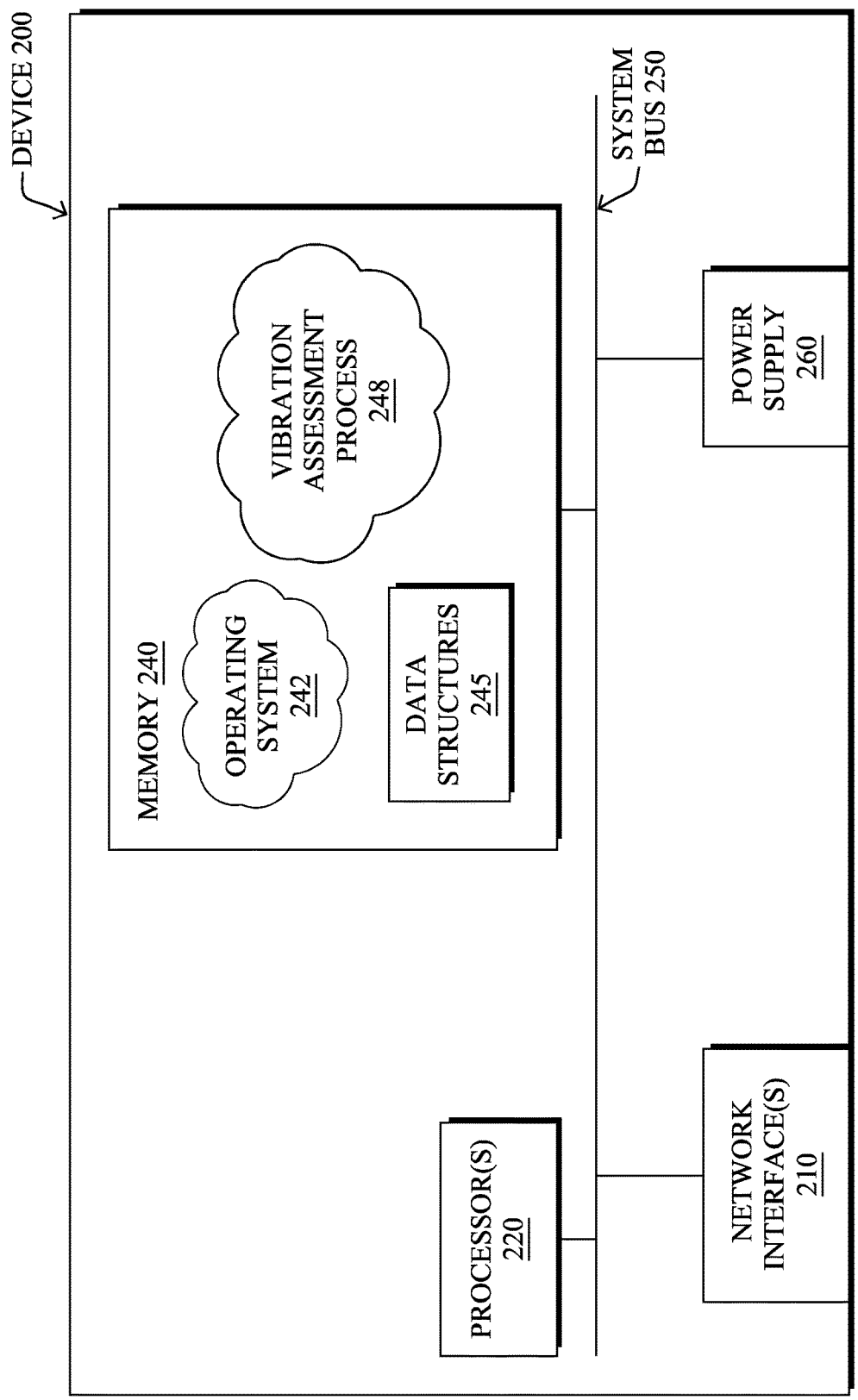
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative vibration assessment process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

During execution, vibration assessment process 248 may operate in a localized or distributed manner to evaluate vibration sensor data captured by any number of sensors of a monitored system (e.g., an HVAC system, an industrial machine/device, etc.). In various embodiments, vibration assessment process 248 may do so by utilizing machine learning techniques, to determine whether the vibration measurement data is indicative of either or both of the following:

- a structural anomaly in the monitored system—for instance, a crack, perforation, broken component, etc., in the physical structure of the monitored system.
- a behavioral anomaly in the monitored system—for instance, an unexpected increase or decrease on the vibration measurements for the system, a change in the pattern of vibrations, etc.

In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, vibration assessment process 248 may employ one or more supervised, unsupervised, or semi-supervised machine learning models. Generally, supervised learning entails the use of a training set of data, as noted above, that is used to train the model to apply labels to the input data. For example, the training data may include sample vibration measurement data that has been labeled as indicative of a structural anomaly. On the other end of the spectrum are unsupervised techniques that do not require a training set of labels. Notably, while a supervised learning model may look for previously seen patterns that have been labeled as such, an unsupervised model may instead look to the underlying patterns of the data, such as how sets of vibration measurements are inter-related and/or change over time. Semi-supervised learning models take a middle ground approach that uses a greatly reduced set of labeled training data.

Example machine learning techniques that vibration assessment process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression techniques, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

As noted above, vibrations are an early indication of failure or deterioration of monitored systems such as machines, motors, heating, ventilation and air conditioning (HVAC) equipment, etc., often found in industrial buildings and manufacturing settings. However, applying machine learning to the analysis of vibration measurement data typically requires the collection of a robust training dataset over a long period of time. Indeed, such data needs to stem from the system being operated at or near its breaking point.

Model selection also presents certain challenges to using vibration measurement data to detect system faults. Unsupervised models, while relatively easy to train, often lead to imprecise results. Supervised learning models are more precise, but are very expensive to train, as they can require manual labeling of a large body of training data.

Even after training a model to assess vibration data for a monitored system, the resulting model is unlikely to be usable to assess vibration measurements from other systems. Notably, the actual behavior of the monitored system may be dependent on factors such as its installation location (e.g., flooring/foundation type, etc.), environmental conditions (e.g., humidity, temperature, etc.), load, speed, and the like.

In other words, each individual system may behave differently. The vibration sensors used to monitor a system can also lead to system-dependent variations that can make a model trained for one system inapplicable to another system. For example, the sensors may return inconsistent measurements due to changes in their installation locations or orientations across the systems, variations in their capabilities (e.g., due to the manufacturing process, different sensor models, etc.), and the like.

IoT-Based Network Architecture for Detecting Faults Using Vibration Measurement Data The techniques herein introduce a network architecture for detecting faults in a monitored system using captured vibration measurement data. In some aspects, the techniques herein leverage machine learning to generate anomaly detection models for both structural anomalies in the system, as well as behavioral anomalies in the system. In further aspects, model training can be achieved leveraging both the cloud and fog layers of an IoT infrastructure and in a manner that tailors the behavioral model to the specific system undergoing monitoring.

Illustratively, the techniques described herein may be performed by hardware, software, and/or firmware, such as in accordance with the vibration assessment process 248, which may include computer executable instructions executed by the processor 220 (or independent processor of interfaces 210) to perform functions relating to the techniques described herein.

Specifically, according to various embodiments, a device in a network receives a machine learning encoder and decoder trained by a supervisory service. The service trains the encoder and decoder using vibration measurement data sent to the service by a plurality of devices. The device trains, based on the received encoder, a classifier to determine whether vibration measurement data is indicative of a behavioral anomaly. The device receives vibration measurement data captured by a particular set of one or more vibration sensors of a monitored system. The device evaluates, using the trained decoder, the received vibration measurement data to determine whether the data is indicative of a structural anomaly in the monitored system. The device evaluates, using the trained classifier, the received vibration measurement data to determine whether the data is indicative of a behavioral anomaly in the monitored system.

Figure 3:
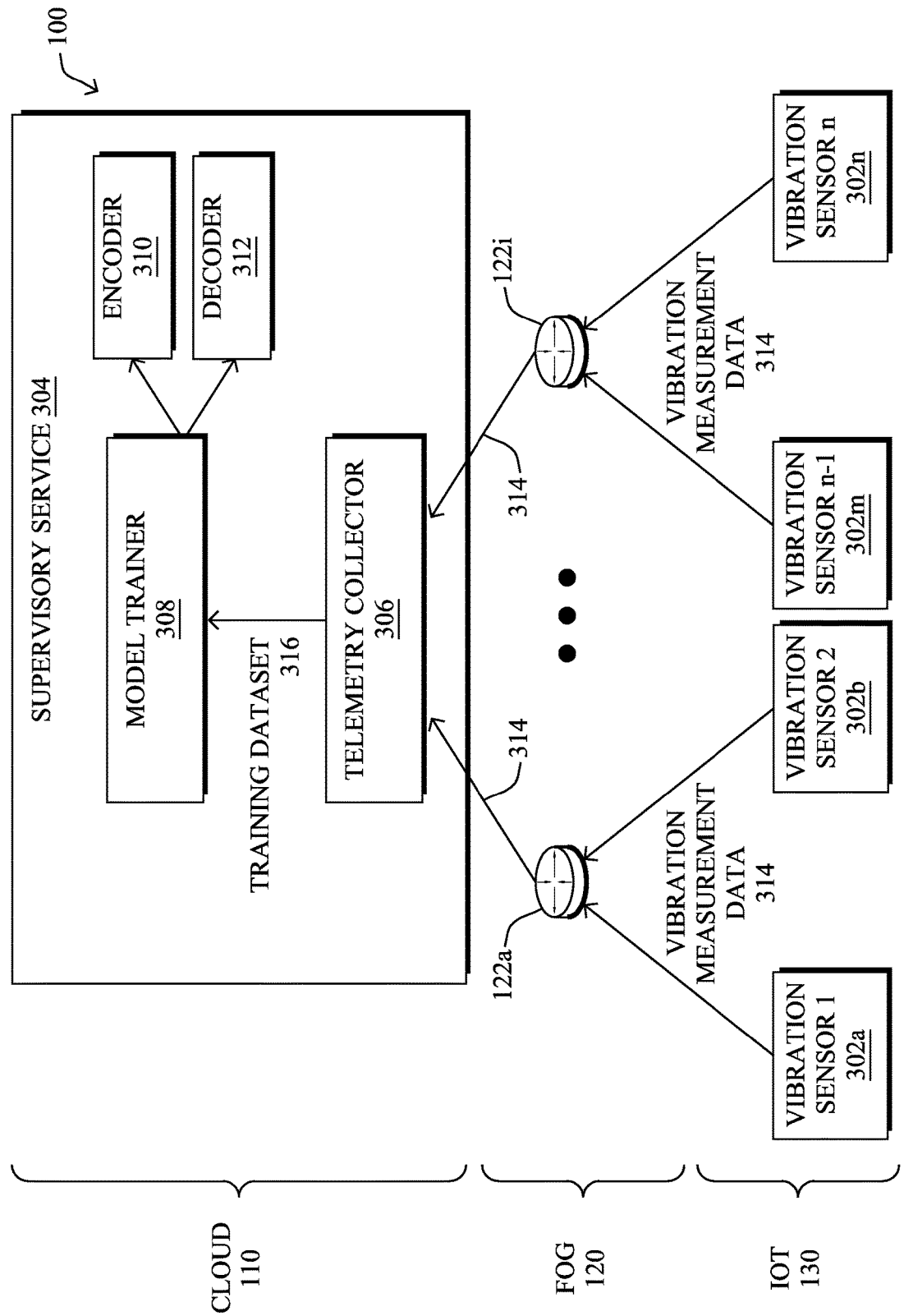
FIG. 3 illustrates an example network architecture for model training.

Operationally, FIG. 3 illustrates an example network architecture for model training, according to various embodiments. Continuing the example of IoT network 100, assume that network 100 includes vibration sensors 302a-302n (e.g., a first through $n^{th}$ sensor) at IoT device layer 130. In other words, vibration sensors 302a-302n may themselves be considered individual IoT nodes 132. In general, each vibration sensor 302 may be associated with a corresponding system to be monitored, such as a machine, piece of HVAC equipment, or the like. The number of vibration sensors 302 for a particular system to be monitored may range from one or more and there may be any number of systems that are monitored by vibration sensors 302a-302n.

During operation, each vibration sensor 302 may capture and report vibration measurement data 314 to its associated fog node/device 122. Accordingly, IoT network 100 may include i-number of fog nodes/devices 122, such as fog nodes 122a-122i shown (e.g., a first through $i^{th}$ node). The capturing of a sensor measurement by a vibration sensor 122, and/or reporting thereof, may be performed periodically and/or in response to a received request to do so. In other words, vibration sensors 302 may capture and report vibration measurement data 314 to their corresponding fog nodes 122 on a pull and/or push basis, depending on the implementation. For example, to conserve battery power, a given sensor 302 may take a vibration measurement regarding its monitored system, report the measurement via vibration measurement data 314, and then enter into a sleep or low power mode until its next reading.

Vibration measurement data 314 may include any or all of the following information:
- Vibration measurements taken by vibration sensors 302.
- Timestamp data indicative of when the measurements were taken.
- Metadata indicative of:
  - The identity of the capturing sensor 302.
  - The location of the capturing sensor 302.
  - Other information, such as the conditions of the sensor 302 (e.g., battery life, ambient temperature, etc.).
  - Any underlying conditions regarding the measured system, such as error codes, operating parameters (e.g., speed, runtime, etc.), or the like.

As noted previously, model training to assess vibration measurement data 314 is computationally-intensive and requires a considerably large pool of training data. Accordingly, in various embodiments, the techniques herein propose a bifurcated training approach whereby the fog nodes 122 from any number of networks send their corresponding vibration measurement data 314 to a supervisory service 304, which is executed at cloud layer 110. More specifically, supervisory service 304 may include any or all of the following components, to construct and train all layer of a machine learning model, such as a neural network. Once trained, the models can be deployed to fog nodes 122 for additional training, in further embodiments.

As shown, supervisory service 304 may include a telemetry collector 306 that obtains vibration measurement data 314 from fog nodes 122 on a pull and/or push basis. In general, telemetry collector 306 is responsible for compiling a suitable pool of vibration measurement data 314 for model training by model trainer 308. In some embodiments, telemetry collector 306 may also apply any number of filtering and/or pre-processing techniques, such as dimensionality reductions, principal component analysis (PCA), or the like, to form the training dataset 316. In further embodiments, telemetry collector 306 may also be responsible for overseeing when and how vibration measurement data 314 is collected by vibration sensors 302. For example, telemetry collector 306 may request that a particular vibration sensor 302 take vibration measurement more frequently, based on the current vibration measurement data 314 available to telemetry collector 306.

Once telemetry collector 306 has generated a sufficient training dataset 316, model trainer 308 of supervisory service 304 may use the training dataset 316 to train a machine learning model. In various embodiments, this may entail model trainer 308 training a neural network-based encoder 310 and decoder 312, using training dataset 316. Note, however, that despite training dataset 316 being formed from vibration measurement data 314 collected from any number of vibration sensors 302, their associated monitored systems, and across any number of different networks. This allows supervisory service 304 to construct a much more robust training dataset 316 and in a much shorter timeframe than by collecting sensor measurements from only a single monitored system. However, a common model for all sensors 302 will not exhibit suitable accuracy. Thus, as a second step to training, the techniques herein also propose performing additional model training at fog layer 120, to customize the generated models to the specific systems being monitored.

Figure 4:
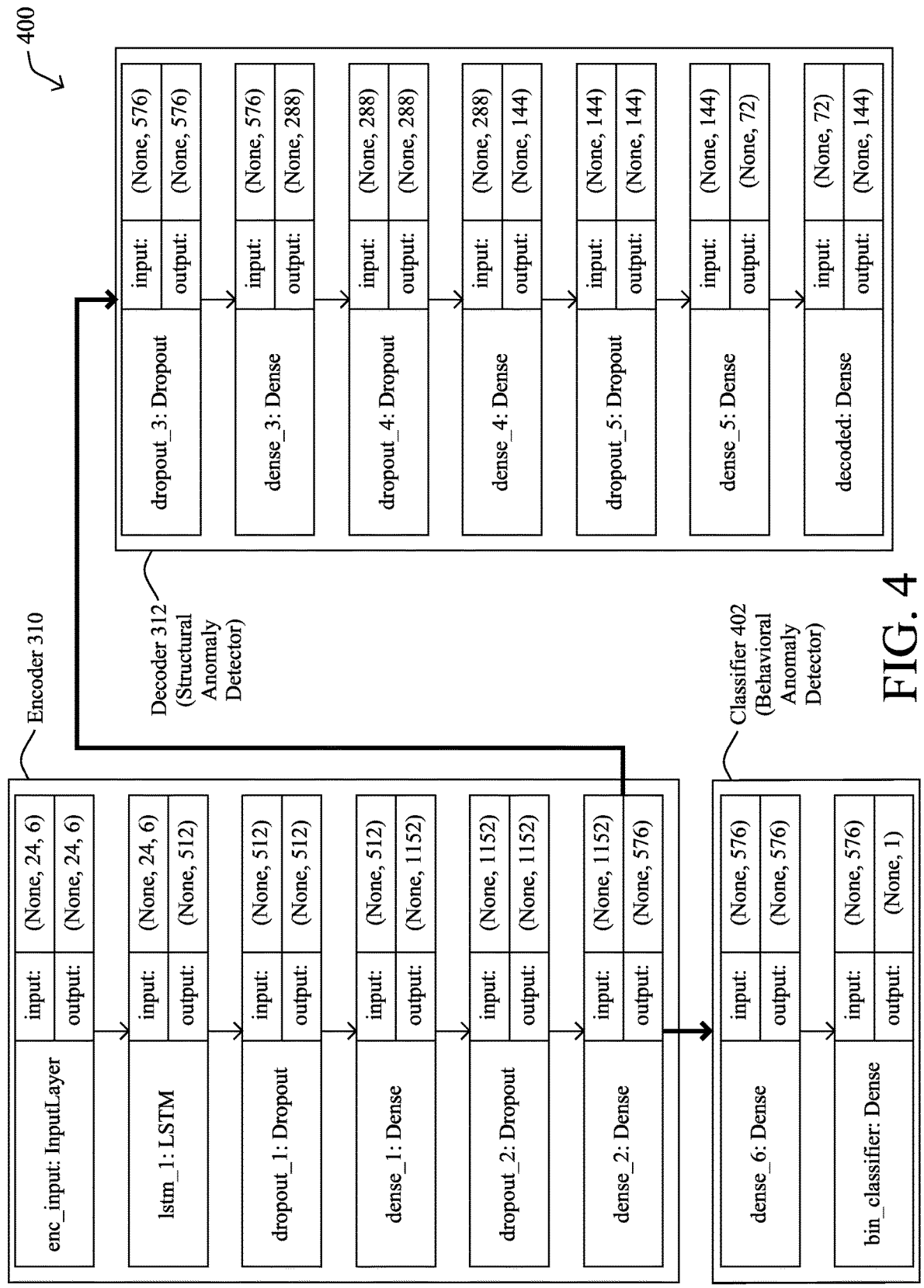
FIG. 4 illustrates an example of machine learning models to assess vibration measurement data.

FIG. 4 illustrates an example of machine learning models to assess vibration is measurement data, according to various embodiments. Using the proposed architecture shown in FIG. 3, model trainer 308 of the cloud-based supervisory service 304 may train both encoder 310 and decoder 312. In some embodiments, encoder 310 may comprise an input layer, a long short-term memory (LSTM) layer, as well as two dense layers that are separated by dropout layers in between.

During the training by model trainer 308, model trainer 308 may similarly train decode 312. As shown, decoder 312 may comprise four dense layers, with dropout layers separating the first three dense layers, in between.

As would be appreciated, the training of encoder 310 and decoder 312 by model trainer 308 may be performed repeatedly until encoder 310 and decoder 312 exhibit a desired level of performance. For example, model trainer 308 may designate a portion of the available training dataset 316 for use as a validation dataset, use the remaining portion of training dataset 316 to train encoder 310 and decoder 312, and use the validation dataset to ensure that the trained encoder 310 and decoder 312 perform adequately on the validation dataset. This process can be repeated any number of times and/or by varying the data samples used for both the training and validation datasets.

According to various embodiments, decoder 312 may be used at the fog layer 120 of an IoT network to detect structural anomalies in the monitored system, based on its corresponding vibration measurement data. Preliminary testing has shown that LSTM-based, unsupervised autoencoder mechanisms, such as the proposed encoder 310 and decoder 312, are able to detect structural anomalies quite well, but are not able to suitably detect behavioral anomalies.

In various embodiments, the techniques herein also propose leveraging encoder 310 to generate a classifier to detect behavioral anomalies in the specific monitored system, such as classifier 402 shown. In some cases, classifier 402 may take the form of a binary classifier that labels captured sensor measurement data as "normal" or "anomalous," by modeling the behavior of the monitored system. Since classifier 402 is tailored to a specific system undergoing monitoring, there may be any number of is classifiers 402 generated across the various systems.

Figure 5:
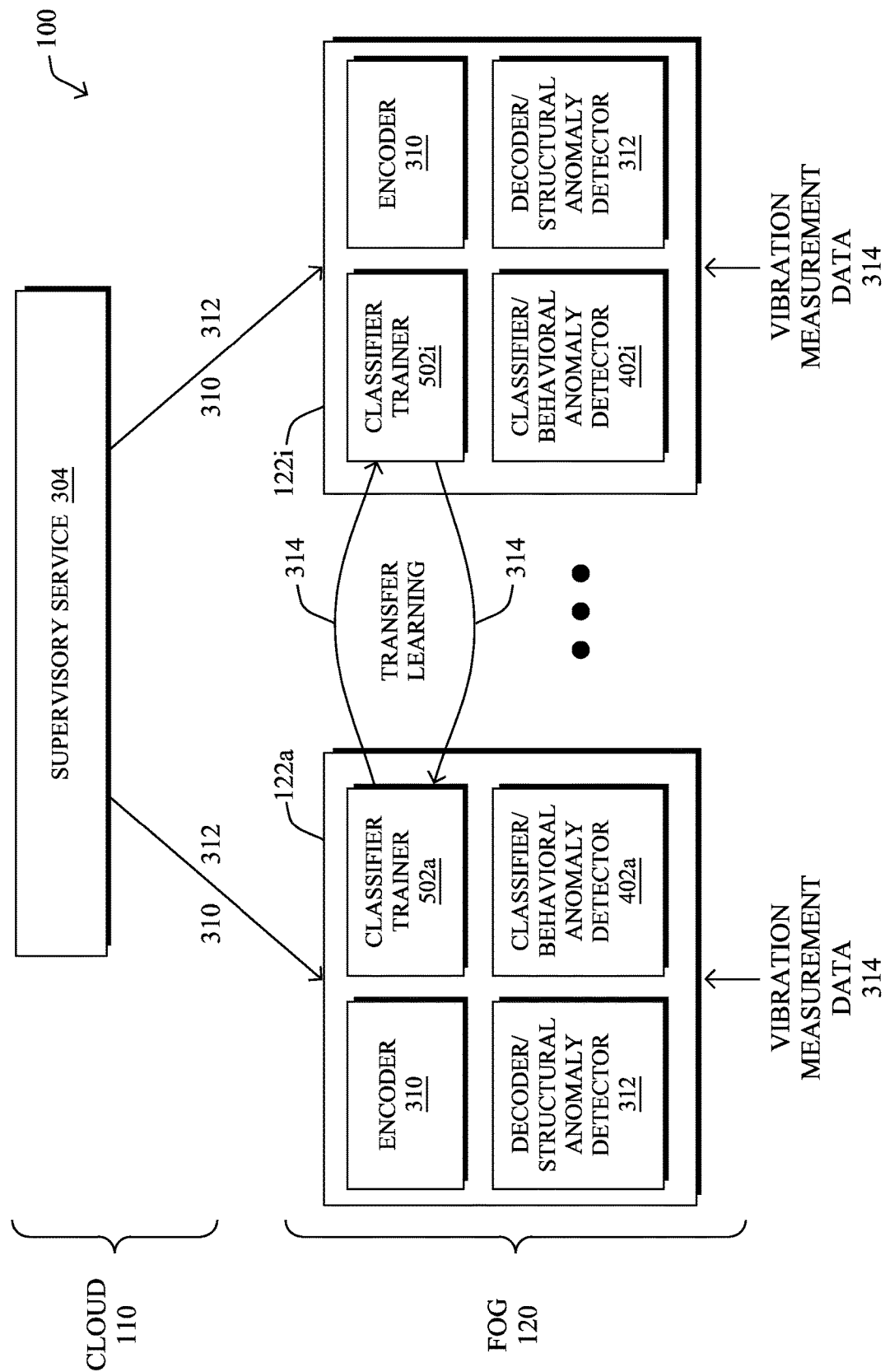
FIG. 5 illustrates an example of classifier training using transfer learning.

FIG. 5 illustrates an example network architecture for training a classifier 402, according to various embodiments. In general, once supervisory service 304 has trained encoder 310 and decoder 312 in a centralized manner, the techniques herein further propose performing a second stage of training at fog layer 120 on fog nodes 122, such as edge routers in the local networks at which the monitored systems are deployed. To do so, supervisory service 304 may send the trained encoder 310 and decoder 312 to the selected fog nodes 122, such as fog nodes 122a and 122i shown.

In various embodiments, each fog node 122 may execute its own, lightweight classifier trainer 502 (e.g., node 122a may execute trainer 502a, node 122i may execute trainer 502i, etc.). During execution by a fog node 122, a classifier trainer 502 is configured to generate a local machine learning classifier 402 based on the received encoder 310 and the vibration measurement data 314 captured by the vibration sensor(s) 302 connected to that fog node.

As shown, the classifier trainers 502 locally executed on fog nodes 122 may leverage transfer learning, to train the local classifiers 402 on fog nodes 122. In general, transfer learning seeks to reuse knowledge gained while solving one problem to apply that knowledge to a different, but related problem. To this end, classifier trainers 502 may train their corresponding classifiers 402 using not only the vibration measurement data 314 collected by that fog node 122, but also vibration measurement data 314 collected by any number of other fog nodes 122 from any number of other, similar monitored systems.

For example, classifier trainer 502a executed by fog node 122 may receive vibration measurement data 314 from a random subset of the other fog nodes 122, such as fog node 122i. In turn, classifier trainer 502 may train classifier 402a to be biased towards the measurement data 316 received from its associated sensor(s) 302 and against the data 316 received from the other fog node(s) 122. Classifier trainer 502i executed by fog node 122i may train its own classifier 402i using a similar approach, such as by is leveraging vibration measurement data 316 received from fog node 122a.

Since the local classifiers 402 on fog nodes 122 are relatively simplistic (e.g., having only two layers), the resource requirements to train them is considerably lower than to train encoder 310 and decoder 312, making it possible to perform this training at fog layer 120. Indeed, a classifier trainer 502 only needs to train the final layer of the overall neural network, to tailor it to the specific system being evaluated by its fog node 122. As the number of weights in the classifier 402 to be tuned by classifier trainer 502 is multiple magnitudes smaller than the total number of weights in the model, making the computational load much lower for this training.

Once trained, the fog node 122 can then use the locally-trained classifier 402 for purposes of detecting behavioral anomalies in the monitored system(s), based on its evaluation of the vibration measurement data 314 that it receives from the vibration sensor(s) 302 installed at the monitored system. Similarly, the fog node 122 may use the decoder 312 received from supervisory service 304 to detect structural anomalies in the monitored system, based on its evaluation of the associated vibration measurement data 314. If the fog node 122 detects either form of anomaly in the monitored system, it may generate and send an alert indicative of the detected anomaly for review by an operator.

A prototype was built to test the efficacy of the techniques herein. During testing, vibration measurement data was collected for two monitored systems, resulting in two datasets. In turn, the datasets were used to train an encoder and a decoder and transfer learning was leveraged to train classifiers tailored to each of the systems. More specifically, four datasets were collected:

Dataset 1—an initial set of vibration measurement data from System 1

Dataset 2—an initial set of vibration measurement data from System 2

Dataset 3—an additional set of vibration measurement data from System 1

Dataset 4—an additional set of vibration measurement data from System 2

In turn, Dataset 1 was used to model the behavior of System 1 and Dataset 2 was used to model the behavior of System 2. Then, Dataset 1 was used as the transfer learning "other" data for modeling System 2 and Dataset 2 was used as the "other" data is for System 1. Datasets 3 and 4 were not used for model training, but only for testing purposes. This gave the following results shown below in Table 1:

TABLE 1

|  | System 1 | System 2 |
|---|---|---|
| Dataset 1:* | | |
| ['osc__19min__90__ver', 'osc__15min__70__ver', 'osc__19min__50__ver', 'comb__1min__10__ver', 'comb__1min__20__ver', 'comb__1min__30__ver', 'osc__9min__40__ver', 'osc__9min__60__ver', 'comb__1min__01__hor', 'comb__1min__10__hor', 'comb__1min__30-35__hor', 'comb__1min__05__hor', 'osc__9min__80__some', 'dcomb__2min__osc40__pulse80'] | Normal | Anomalous |
| Dataset 2:* | | |
| ['puls__10min__30__ver', 'comb__1min__40__ver', 'comb__1min__50__ver', 'osc__9min__20__ver', 'comb__1min__40__hor', 'comb__1min__60__hor', 'comb__1min__80__hor', 'comb__1min__99__hor', 'osc__10min__30__ver', 'dcomb__2min__osc30__pulse70', 'dcomb__2min__osc10__pulse50', 'dcomb__2min__osc20__pulse60'] | Anomalous | Normal |
| Dataset 3:* | | |
| ['osc__9min__99__ver', 'comb__1min__15__hor', 'comb__1min__20__hor', 'comb__1min__25__hor'] | Normal | Anomalous |
| Dataset 4:* | | |
| ['comb__1min__50__hor', 'comb__1min__70__hor', 'osc__19min__30__ver', 'comb__1min__90__hor'] | Anomalous | Normal |

Figure 6:
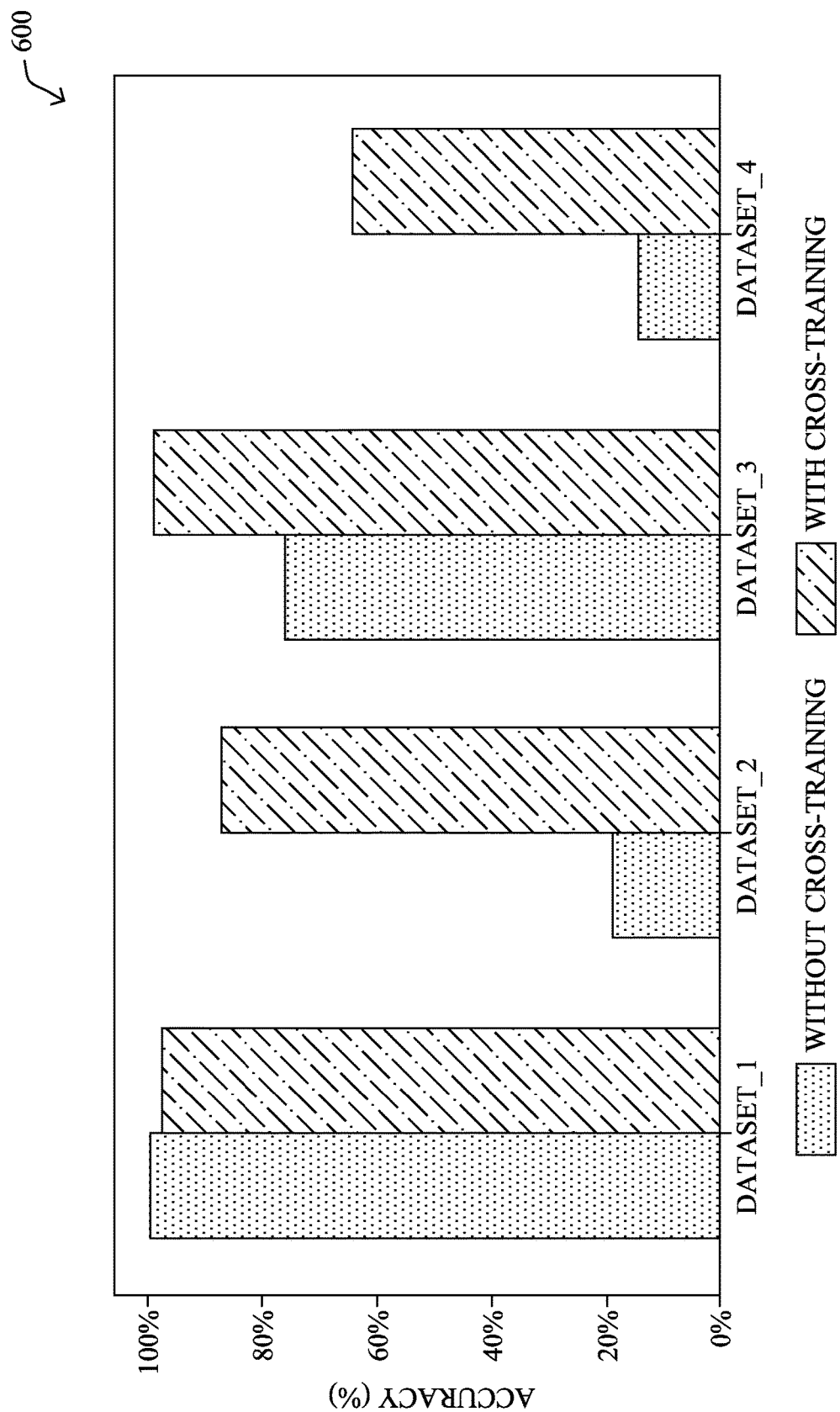
FIG. 6 illustrates an example plot of test results.

FIG. 6 illustrates an example plot 600 showing the accuracy of the trained models across the four datasets above, with and without cross-training the models using transfer learning. As shown, the resulting models were able to greatly improve their accuracies across the various datasets. This is because the resulting models were able to detect both structural and behavioral anomalies.

Figure 7:
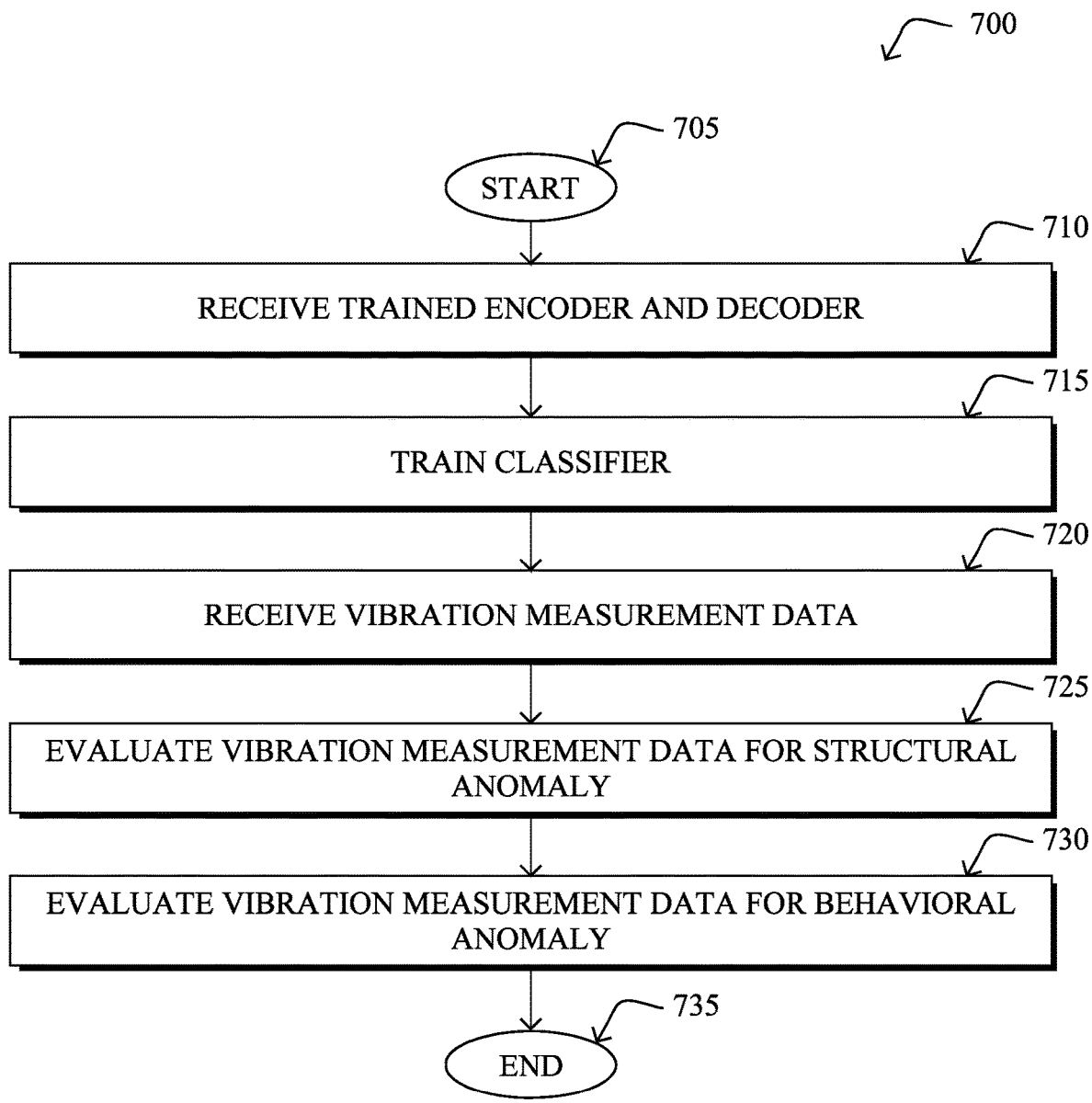
FIG. 7 illustrates an example simplified procedure for evaluating vibration measurement data.

FIG. 7 illustrates an example simplified procedure for evaluating vibration measurement data, in accordance with one or more embodiments described herein. The procedure 700 may start at step 705, and continues to step 710, where, as described in greater detail above, a device in a network (e.g., device 200), such as fog node (e.g., a router or other piece of networking gear), may receive a machine learning encoder and decoder trained by a supervisory service. For example, the device may be in communication with a service that is executed within the network of the device or located remotely, such as in the cloud. In general, the service trains the encoder and decoder is using vibration measurement data sent to the service by a plurality of devices. For example, the data used to train the encoder and decoder may be provided by a set of devices that includes the device itself and/or any number of other devices/fog nodes across any number of networks.

At step 715, as detailed above, the device may train, based in part on the received encoder, a classifier to determine whether vibration measurement data is indicative of a behavioral anomaly. In some embodiments, the device may do so using vibration measurement data captured by a particular set of one or more vibration sensors associated with the device and for a system to be monitored by the device. In addition, the device may further train the classifier by receiving vibration measurement data captured by one or more vibration sensors outside of the particular set and using a transfer learning approach to train the classifier based in part on the vibration measurement data captured by the one or more vibration sensors outside of the particular set. For the reasons stated previously, transfer learning can help to greatly improve the accuracy of the trained classifier.

At step 720, the device may receive vibration measurement data captured by a particular set of one or more vibration sensors of a monitored system, as described in greater detail above. For example, if the device is a fog node, it may receive vibration sensor data from any or all of the vibration sensors below it in the topology of the network.

At step 725, as detailed above, the device may evaluate, using the trained decoder, the received vibration measurement data to determine whether the data is indicative of a structural anomaly in the monitored system. Notably, evaluation of the received measurement data may indicate the presence of a crack, perforation, broken component, etc., of the monitored system.

At step 730, the device may evaluate, using the trained classifier, the received is vibration measurement data to determine whether the data is indicative of a behavioral anomaly in the monitored system, as described in greater detail above. By training the classifier to the specific behavior of the monitored system, this allows the device to use the classifier to determine whether the further behavior of the system, as indicated by its vibration measurement data, is 'normal' or 'anomalous.' For example, the classifier may determine that the monitored system is exhibiting abnormally high vibration (e.g., above a threshold). In cases in which the device determines that a structural or behavioral anomaly exists in the monitored system, the device may send an alert regarding the detected anomaly, such as to a user interface of a technician for the monitored system. Procedure 700 then ends at step 735.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the detection of faults/anomalies in a monitored system based on vibration measurements taken from the system. In some aspects, the techniques herein introduce an IoT-based network architecture for both model training and fault detection in an intelligent manner across the various layers of an IoT network.

While there have been shown and described illustrative embodiments for detecting faults using vibration measurement data, it is to be understood that various other adaptations and modifications may be made within the intent and scope of the embodiments herein. For example, while specific models are shown herein for purposes of illustration, other models may be generated in a similar manner, such as with a different number of types of layers. Further, while the techniques herein are described as being performed by certain locations within a network, the techniques herein could also is be performed at other locations, as desired (e.g., fully in the cloud, fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   receiving, at a device in a network, a machine learning encoder and decoder of a cloud-based supervisory service, wherein the cloud-based supervisory service trains the encoder and decoder using vibration measurement data sent to the cloud-based supervisory service by a plurality of devices in the network that receive the vibration measurement data captured by one or more vibration sensors of a monitored system;
   training, by the device and based on the received encoder, a classifier to determine whether the vibration measurement data is indicative of a behavioral anomaly;
   receiving, at the device, particular vibration measurement data captured by a particular set of the one or more vibration sensors;
   evaluating, by the device and using the trained decoder, the particular vibration measurement data to determine whether the particular vibration measurement data is indicative of a structural anomaly in the monitored system; and
   evaluating, by the device and using the trained classifier, the particular vibration measurement data to determine whether the particular vibration measurement data is indicative of a behavioral anomaly in the monitored system.

2. The method as in claim 1, wherein the device is a router in the network.

3. The method as in claim 1, wherein the plurality of devices comprises the device in the network.

4. The method as in claim 1, wherein the devices of the plurality are located in two or more networks.

5. The method as in claim 1, wherein training the classifier, based on the received encoder, to determine whether the vibration measurement data is indicative of a behavioral anomaly:
   receiving, at the device, vibration measurement data captured by one or more vibration sensors outside of the particular set; and
   using, by the device, a transfer learning approach to train the classifier based in part on the vibration measurement data captured by the one or more vibration sensors outside of the particular set.

6. The method as in claim 1, wherein the encoder comprises a long short-term memory (LSTM) layer.

7. The method as in claim 1, wherein evaluating, using the trained decoder, the particular vibration measurement data to determine whether the particular vibration measurement data is indicative of a structural anomaly in the monitored system comprises:
   determining that the particular vibration measurement data is indicative of a structural anomaly in the monitored system; and
   sending, via the network, an alert regarding the structural anomaly in the monitored system.

8. The method as in claim 1, wherein evaluating, using the trained classifier, the particular vibration measurement data to determine whether the particular vibration measurement data is indicative of a behavioral anomaly in the monitored system comprises:
   determining that the particular vibration measurement data is indicative of a behavioral anomaly in the monitored system; and
   sending, via the network, an alert regarding the behavioral anomaly in the monitored system.

9. An apparatus, comprising:
   one or more network interfaces to communicate with a network;
   a processor coupled to the network interfaces and configured to execute one or more processes; and
   a memory configured to store a process executable by the processor, the process when executed configured to:
      receive a machine learning encoder and decoder of a cloud-based supervisory service, wherein the cloud-based supervisory service trains the encoder and decoder using vibration measurement data sent to the cloud-based supervisory service by a plurality of devices in the network that receive vibration measurement data captured by one or more vibration sensors of a monitored system;
      train, based on the received encoder, a classifier to determine whether the vibration measurement data is indicative of a behavioral anomaly;
      receive particular vibration measurement data captured by a particular set of the one or more vibration sensors;
      evaluate, using the trained decoder, the particular vibration measurement data to determine whether the particular vibration measurement data is indicative of a structural anomaly in the monitored system; and
      evaluate, using the trained classifier, the particular vibration measurement data to determine whether the particular vibration measurement data is indicative of a behavioral anomaly in the monitored system.

10. The apparatus as in claim 9, wherein the apparatus is a router in the network.

11. The apparatus as in claim 9, wherein the plurality of devices comprises the apparatus.

12. The apparatus as in claim 9, wherein the devices of the plurality are located in two or more networks.

13. The apparatus as in claim 9, wherein the apparatus trains the classifier, based on the received encoder, to determine whether the vibration measurement data is indicative of a behavioral by:
   receiving vibration measurement data captured by one or more vibration sensors outside of the particular set; and
   using a transfer learning approach to train the classifier based in part on the vibration measurement data captured by the one or more vibration sensors outside of the particular set.

14. The apparatus as in claim 9, wherein the encoder comprises a long short-term memory (LSTM) layer.

15. The apparatus as in claim 9, wherein the apparatus evaluates, using the trained decoder, the particular vibration measurement data to determine whether the particular vibration measurement data is indicative of a structural anomaly in the monitored system by:
  determining that the particular vibration measurement data is indicative of a structural anomaly in the monitored system; and
  sending, via the network, an alert regarding the structural anomaly in the monitored system.

16. The apparatus as in claim 9, wherein the apparatus evaluates, using the trained classifier, the particular vibration measurement data to determine whether the particular vibration measurement data is indicative of a behavioral anomaly in the monitored system by:
  determining that the particular vibration measurement data is indicative of a behavioral anomaly in the monitored system; and
  sending, via the network, an alert regarding the behavioral anomaly in the monitored system.

17. A tangible, non-transitory, computer-readable medium storing program instructions that cause a device in a network to execute a process comprising:
  receiving, at the device in the network, a machine learning encoder and decoder of a cloud-based supervisory service, wherein the cloud-based supervisory service trains the encoder and decoder using vibration measurement data sent to the cloud-based supervisory service by a plurality of devices in the network that receive vibration measurement data captured by one or more vibration sensors of a monitored system;
  training, by the device and based on the received encoder, a classifier to determine whether the vibration measurement data is indicative of a behavioral anomaly;
  receiving, at the device, particular vibration measurement data captured by a particular set of the one or more vibration sensors;
  evaluating, by the device and using the trained decoder, the particular vibration measurement data to determine whether the particular vibration measurement data is indicative of a structural anomaly in the monitored system; and
  evaluating, by the device and using the trained classifier, the particular vibration measurement data to determine whether the particular vibration measurement data is indicative of a behavioral anomaly in the monitored system.

18. The computer-readable medium as in claim 17, wherein the device is a router in the network.

19. The computer-readable medium as in claim 17, wherein training the classifier, based on the received encoder, to determine whether the vibration measurement data is indicative of a behavioral anomaly:
  receiving, at the device, vibration measurement data captured by one or more vibration sensors outside of the particular set; and
  using, by the device, a transfer learning approach to train the classifier based in part on the vibration measurement data captured by the one or more vibration sensors outside of the particular set.

20. The computer-readable medium as in claim 17, wherein the encoder comprises a long short-term memory (LSTM) layer.

* * * * *